United States Patent
Song et al.

(10) Patent No.: US 7,456,921 B2
(45) Date of Patent: Nov. 25, 2008

(54) LIQUID CRYSTAL DISPLAY

(75) Inventors: Jang-Kun Song, Seoul (KR); Sahng-Ik Jun, Seoul (KR); Jae-Hong Jeon, Seongnam-si (KR); Jeong-Young Lee, Yongin-si (KR); Jae-Ho Lee, Seoul (KR)

(73) Assignee: Samsung Electronics, Co., Ltd., Kyungki-do (KR)

( * ) Notice: Subject to any disclaimer, the term of this patent is extended or adjusted under 35 U.S.C. 154(b) by 0 days.

(21) Appl. No.: 11/697,984

(22) Filed: Apr. 9, 2007

(65) Prior Publication Data

US 2007/0177091 A1    Aug. 2, 2007

Related U.S. Application Data

(63) Continuation of application No. 10/965,267, filed on Oct. 15, 2004, now Pat. No. 7,218,369.

(30) Foreign Application Priority Data

Oct. 15, 2003    (KR) ............... 10-2003-0071707

(51) Int. Cl.
    *G02F 1/1337*   (2006.01)
(52) U.S. Cl. .................... 349/129; 349/143
(58) Field of Classification Search ............ 349/129
    See application file for complete search history.

(56) References Cited

U.S. PATENT DOCUMENTS

| | | | |
|---|---|---|---|
| 6,567,144 B1 | 5/2003 | Kim et al. | |
| 6,577,366 B1 | 6/2003 | Kim et al. | |
| 6,760,087 B2 | 7/2004 | Wu et al. | |
| 7,283,190 B2 | 10/2007 | Sasaki et al. | |
| 2001/0019392 A1* | 9/2001 | Sakamoto et al. | 349/139 |
| 2002/0036740 A1* | 3/2002 | Kubo et al. | 349/129 |
| 2003/0058394 A1 | 3/2003 | Wu et al. | |

* cited by examiner

*Primary Examiner*—David C. Nelms
*Assistant Examiner*—Phu Vu
(74) *Attorney, Agent, or Firm*—Macpherson Kwok Chen & Heid LLP; Mark A. Pellegrini

(57) ABSTRACT

A liquid crystal display is provided, which includes: a first substrate; a first signal line formed on the first substrate; a second signal line formed on the first substrate and intersecting the first signal line; a thin film transistor connected to the first and the second signal lines; a pixel electrode connected to the thin film transistor; a second substrate; a common electrode formed on the second substrate; a liquid crystal layer interposed between the first substrate and the second substrate; and a tilt direction determining member formed on one of the first and the second substrates and having a notch.

12 Claims, 10 Drawing Sheets

LIQUID CRYSTAL DISPLAY

CROSS-REFERENCE TO RELATED APPLICATIONS

This application is a continuation of and claims the benefit of U.S. patent application Ser. No. 10/965,267 filed on Oct. 15, 2004, now U.S. Pat. No. 7,218,369 which claims priority to and the benefit of Korean Patent Application No. 10-2003-0071707 filed in the Korean Intellectual Property Office on Oct. 15, 2003, all of which are incorporated herein by reference.

BACKGROUND OF THE INVENTION

1. Field of the Invention

The present invention relates to a liquid crystal display.

2. Description of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertical alignment (VA) mode LCD, which aligns LC molecules such that the long axes of the LC molecules are perpendicular to the panels in absence of electric field, is spotlighted because of its high contrast ratio and wide reference viewing angle that is defined as a viewing angle making the contrast ratio equal to 1:10 or as a limit angle for the inversion in luminance between the grays.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the reference viewing angle is widened.

However, the cutouts and the protrusions may yield spots or afterimages and the spots generated by scrubbing the LCD are remained. It is because the tilt directions of the liquid crystal molecules near the cutouts and the protrusions are determined by push of the liquid crystal molecules on the field-generating electrodes or by collision with them and thus the alignment of the liquid crystal molecules is unstable and irregular.

SUMMARY OF THE INVENTION

A motivation of the present invention is to solve the problems of the conventional art.

A liquid crystal display is provided, which includes: a first substrate; a first signal line formed on the first substrate; a second signal line formed on the first substrate and intersecting the first signal line; a thin film transistor connected to the first and the second signal lines; a pixel electrode connected to the thin film transistor; a second substrate; a common electrode formed on the second substrate; a liquid crystal layer interposed between the first substrate and the second substrate; and a tilt direction determining member formed on one of the first and the second substrates and having a notch.

The notch may be convex or concave and may be triangular, rectangular, trapezoidal, or semicircular.

The tilt direction determining member may have two opposite main edges facing each other and the notch may have an edge oblique to or perpendicular to the main edges of the tilt direction determining member.

The tilt direction determining member may include a cutout formed at the pixel electrode or the common electrode.

The cutout may have a width ranging about 8-10 microns.

The tilt direction determining member may include a protrusion.

The tilt direction determining member may have two opposite main edges facing each other and making an angle of about 45 degrees with the first signal line.

The liquid crystal display may further include first and second polarizers disposed on the first and the second substrates and having crossed transmissive axes.

The liquid crystal layer may have negative anisotropy and subjected to a vertical alignment.

The transmissive axis of one of the polarizers may be parallel to the first signal line.

The tilt direction determining member may have inversion symmetry with respect to a straight line bisecting the pixel electrode the transmissive axis of one of the polarizers are parallel to the first signal line.

The second signal line may include a curved portion and an intersecting portion connected to the curved portion and intersecting the gate line.

The curved portion of the data line may include a pair of rectilinear portions connected to each other and making an angle of about 45 degrees with the gate line.

The liquid crystal display may further include a third signal line separated from the first and the second signal lines and overlapping the pixel electrode.

The third signal line may overlap tilt direction determining member.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
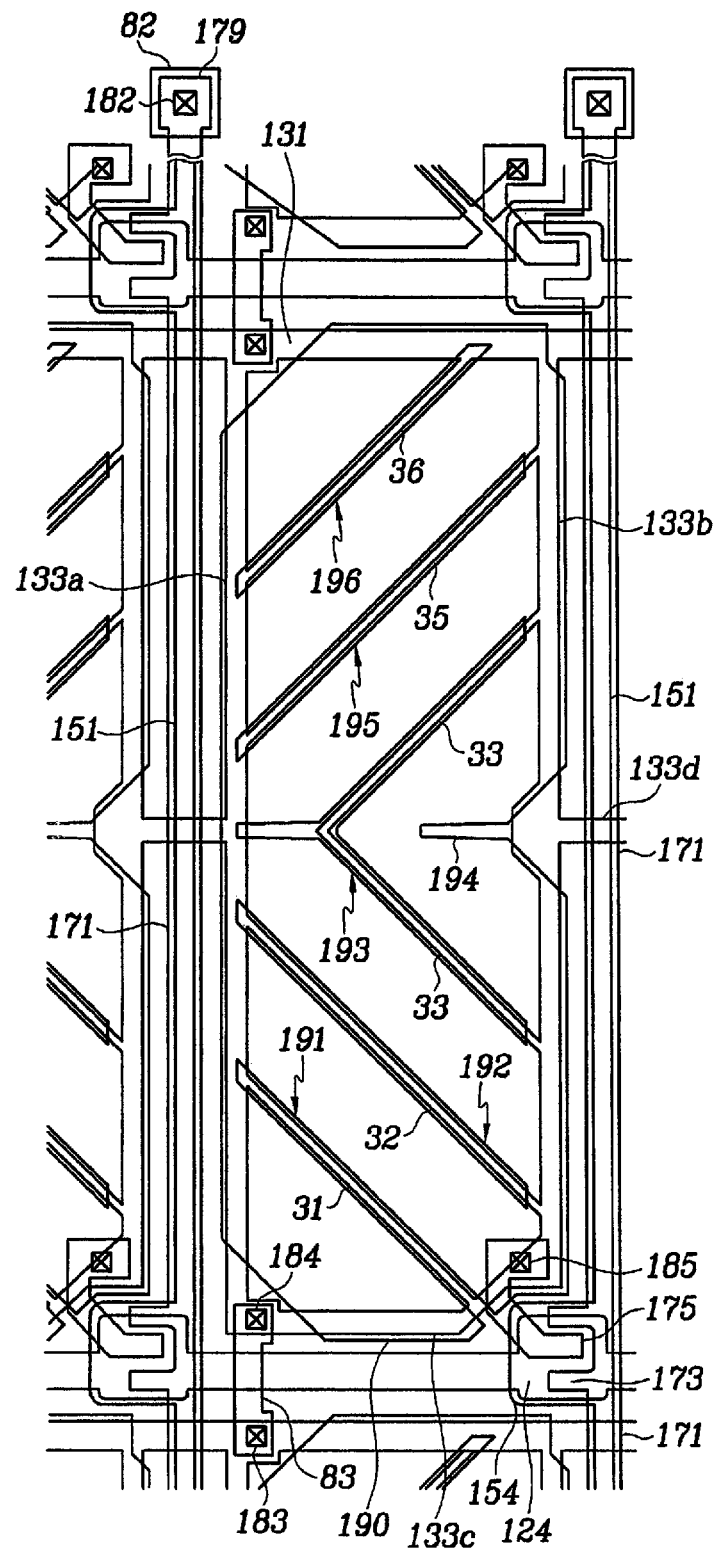
FIG. 1 is a layout view of a TFT array panel of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays and thin film transistor (TFT) array panels for LCDs according to embodiments of the present invention will be described with reference to the accompanying drawings.

An LCD according to an embodiment of the present invention will be described in detail with reference to FIGS. 1-4.

Figure 2:
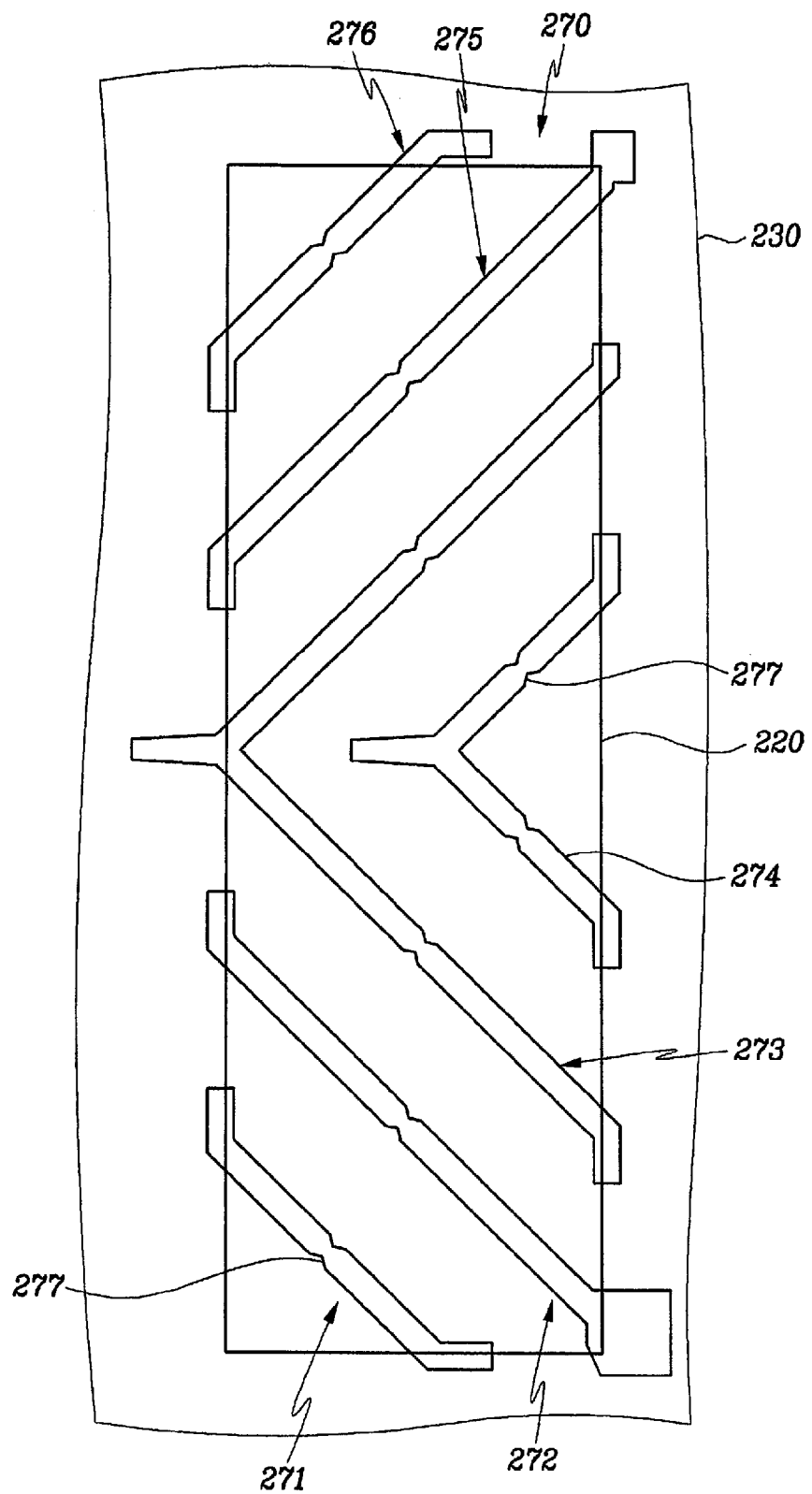
FIG. 2 is a layout view of a common electrode panel of an LCD according to an embodiment of the present invention.
Figure 3:
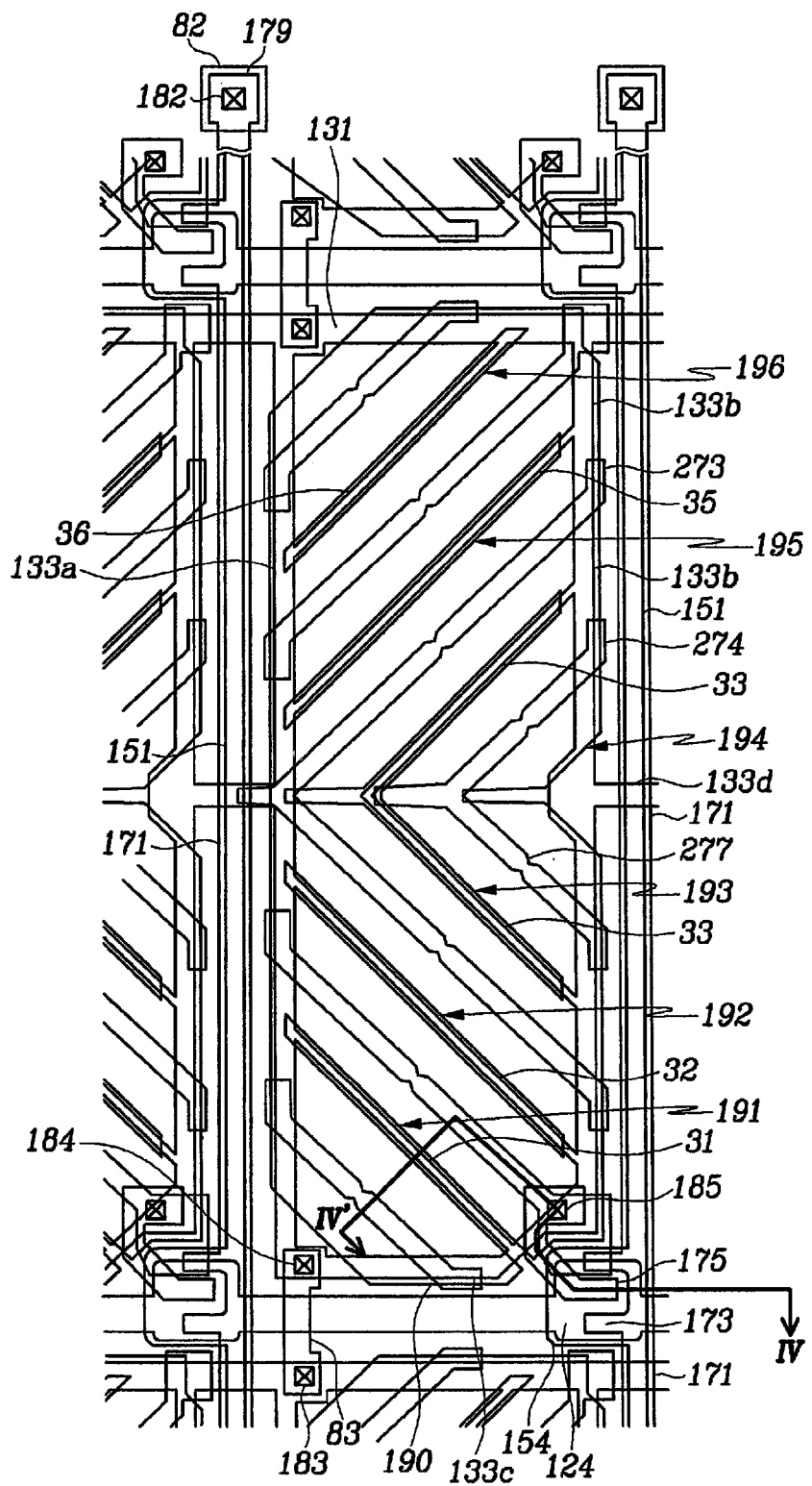
FIG. 3 is a layout view of an LCD including the TFT array panel shown in FIG. 1 and the common electrode panel shown in FIG. 2.
Figure 4:
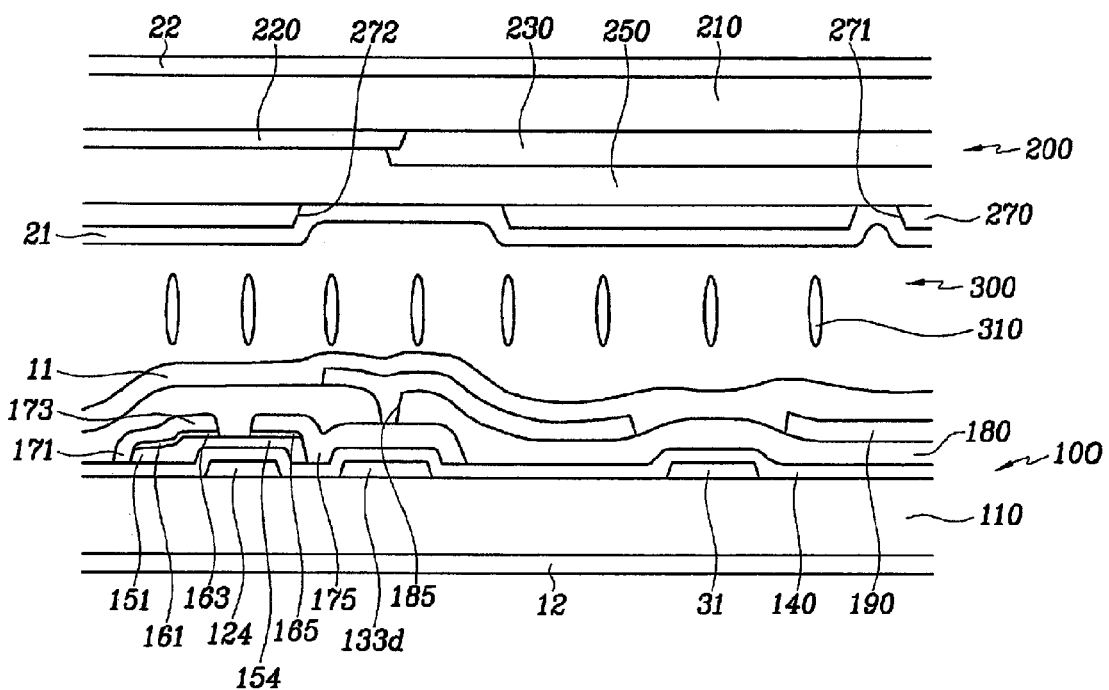
FIG. 4 is a sectional view of the LCD shown in FIG. 3 taken along the line IV-IV'.
Figure 5A:
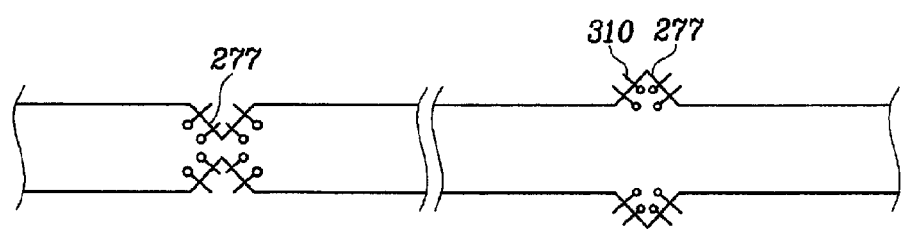
FIGS. 5A-5D illustrate various shapes of the notches shown in FIGS. 2 and 3.
Figure 5B:
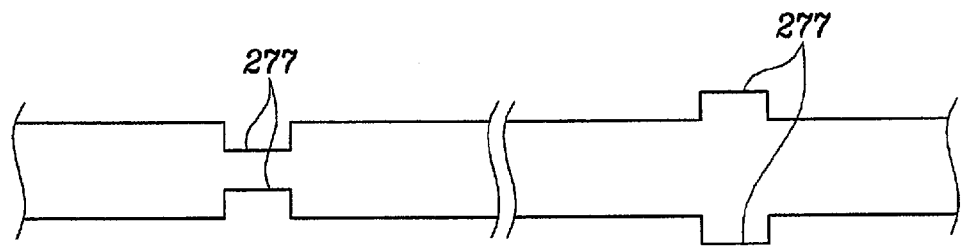
Figure 5C:
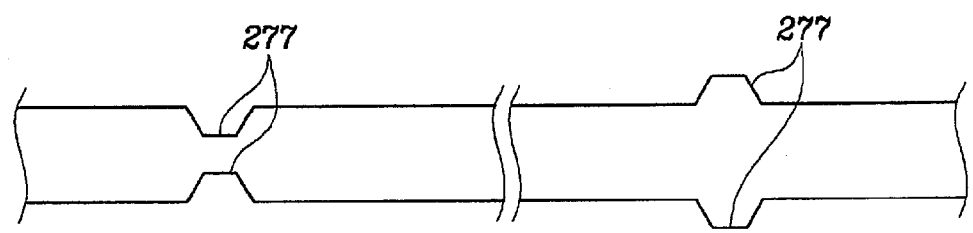
Figure 5D:
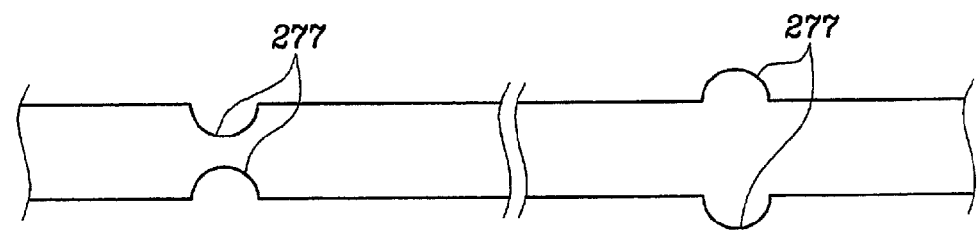

FIG. 1 is a layout view of a TFT array panel of an LCD according to an embodiment of the present invention, FIG. 2 is a layout view of a common electrode panel of an LCD according to an embodiment of the present invention, FIG. 3 is a layout view of an LCD including the TFT array panel shown in FIG. 1 and the common electrode panel shown in FIG. 2, and FIG. 4 is a sectional view of the LCD shown in FIG. 3 taken along the line IV-IV'.

An LCD according to an embodiment of the present invention includes a TFT array panel 100 including pixel electrodes 190, TFTs, and signal lines 121, 131 and 171, a common electrode panel 200 including a common electrode 190, and a LC layer 300 interposed between the panels 100 and 200 and containing a plurality of LC molecules 310.

The TFT array panel 100 is now described in detail with reference FIGS. 1, 3 and 4.

A plurality of gate lines 121 and a plurality of storage electrode lines 131 are formed on an insulating substrate 110 such as transparent glass.

The gate lines 121 transmitting gate signals extend substantially in a transverse direction and are separated from each other. Each gate line 121 includes a plurality of projections forming a plurality of gate electrodes 124 and it may include an end portion having a large area for connection with a driving circuit that may be integrated into the TFT array panel 100 or mounted on the TFT array panel 100 in a form of integrated circuit chip.

Each storage electrode line 131 extends substantially in the transverse direction and includes a plurality of sets of a ring-shaped branch 133a-133c and oblique branches 31-36 connected to the ring-shaped branch 133a-133c and a plurality of branch connections 133d connected between adjacent branches 133a-133c. Each branch set includes a pair of first and second storage electrodes 133a and 133b extending in a longitudinal direction and a third storage electrode 133c connected to ends of the first and the second storage electrodes 133a and 133b and extending in the transverse direction and in an oblique direction. The oblique branches 31, 32, 35, 36 are connected to two of the first to the third storage electrodes 133a-133c. The oblique branch 33 obliquely runs from the second storage electrode 133b to the first storage electrode 133a and changes its course near a center of the first storage electrode 133a to return to the second storage electrode 133b. The storage electrode lines 131 are supplied with a predetermined voltage such as a common voltage, which is applied to a common electrode 270 on the common electrode panel 200 of the LCD.

The gate lines 121 and the storage electrode lines 131 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta. The gate lines 121 and the storage electrode lines 131 may have a multi-layered structure including two films having different physical characteristics. One of the two films is preferably made of low resistivity metal including Al containing metal, Ag containing metal, and Cu containing metal for reducing signal delay or voltage drop in the gate lines 121 and the storage electrode lines 131. The other film is preferably made of material such as Cr, Mo and Mo alloy, Ta or Ti, which has good physical, chemical, and electrical contact characteristics with other materials such as indium tin oxide (ITO) or indium zinc oxide (IZO). Good examples of the combination of the two films are a lower Cr film and an upper Al—Nd alloy film and a lower Al film and an upper Mo film. The gate lines 121 and the storage electrode lines 131 may have a triple-layered structure including a lower Mo film, an intermediate Al film, and an upper Mo film.

In addition, the lateral sides of the gate lines 121 and the storage electrode lines 131 are inclined relative to a surface of the substrate, and the inclination angle thereof ranges about 30-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated to "a-Si") or polysilicon are formed on the gate insulating layer 140. Each semiconductor stripe 151 extends substantially in the longitudinal direction and has a plurality of projections 154 branched out toward the gate electrodes 124.

A plurality of ohmic contact stripes and islands 161 and 165 preferably made of silicide or n+ hydrogenated a-Si heavily doped with n type impurity such as phosphorous are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate, and the inclination angles thereof are preferably in a range between about 30-80 degrees.

A plurality of data lines 171 and a plurality of drain electrodes 175 separated from the data lines 171 are formed on the ohmic contacts 161 and 165 and the gate insulating layer 140.

The data lines 171 for transmitting data voltages extend substantially in the longitudinal direction and intersect the gate lines 121 and the storage electrode lines 131. In particular, the data lines 171 intersect the branch connections 133d such that each data line 171 is disposed between adjacent two of the ring-shaped branches 133a-133c. Each data line 171 includes an end portion 179 having a large area for contact with another layer or an external device. A plurality of branches of each data line 171, which project toward the gate electrodes 124, form a plurality of curved (like a crescent) source electrodes 173. Each drain electrode 175 includes an end portion having a large area for contact with another layer and another end portion partly enclosed by a source electrode 173. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The data lines 171 and the drain electrodes 175 are preferably made of refractory metal such as Cr, Mo, Ti, Ti, or alloys thereof and they may also have a multilayered structure including a lower film (not shown) preferably made of refractory metal and an upper film (not shown) located thereon and preferably made of low resistivity material such as Al containing metal. Alternatively, the data lines 171, etc., include triple layers interposing an intermediate layer of Al or Al alloy.

Like the gate lines 121 and the storage electrode lines 131, the data lines 171 and the drain electrodes 175 have tapered lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175.

A passivation layer 180 is formed on the data lines 171, the drain electrodes 175, and the exposed portions of the semiconductor stripes 151. The passivation layer 180 is preferably made of photosensitive organic material having a good flatness characteristic, low dielectric insulating material having dielectric constant lower than 4.0 such as a-Si:C:O and a-Si:O:F formed by plasma enhanced chemical vapor deposition (PECVD), or inorganic material such as silicon nitride. The passivation layer 180 may include a lower film of inorganic insulator and an upper film of organic insulator.

The passivation layer 180 has a plurality of contact holes 182 and 185 exposing the end portions 179 of the data lines 171 and the end portions of the drain electrodes 175, respectively. The passivation layer 180 and the gate insulating layer 140 have a plurality of contact holes 183 and 184 exposing upper left corners and lower left corners of the ring-type branches 133a-133c, respectively.

A plurality of pixel electrodes 190, a plurality of contact assistants 82, and a plurality of overpasses 83, which are preferably made of a transparent conductor such as ITO and IZO or a reflective conductor such as Al, are formed on the passivation layer 180.

The pixel electrodes 190 are physically and electrically connected to the drain electrodes 175 through the contact holes 185 such that the pixel electrodes 190 receive the data voltages from the drain electrodes 175.

The pixel electrodes 190 supplied with the data voltages generate electric fields in cooperation with the common electrode 270, which determine the orientations of LC molecules 310 in the LC layer 300.

A pixel electrode 190 and the common electrode 270 form a LC capacitor, which stores applied voltages after turn-off of the TFT. An additional capacitor called a "storage capacitor," which is connected in parallel to the LC capacitor, is provided for enhancing the voltage storing capacity. The storage capacitors are implemented by overlapping the pixel electrodes 190 with the storage electrode lines 131 including the storage electrodes 133a and 133b.

Each pixel electrode 190 is chamfered at its left corners and the chamfered edges of the pixel electrode 190 make an angle of about 45 degrees with the gate lines 121.

Each pixel electrode 190 has a plurality of lower cutouts 191 and 192, upper cutouts 195 and 196, and center cutouts 193 and 194, which partition the pixel electrode 190 into a plurality of partitions and overlap the oblique branches 31-36 of the storage electrode lines 131. The oblique branches 31-36 can control texture that may be occur at intermediate positions of the cutouts 191-196. The lower and the upper cutouts 191, 192, 195 and 196 are disposed at lower and upper halves of the pixel electrode 190, respectively, and the center cutouts 193 and 194 are located between the lower cutouts 191 and 192 and the upper cutouts 195 and 196. The cutouts 191-196 substantially have inversion symmetry with respect to an imaginary transverse center line bisecting the pixel electrode 190 into the upper and the lower halves.

The lower and the upper cutouts 191, 192, 195 and 196 make an angle of about 45 degrees to the gate lines 121, and the upper cutouts 195 and 196, which extend substantially parallel to each other and to the chamfered upper left edge of the pixel electrode 190, extend substantially perpendicular to the lower cutouts 191 and 192, which extend substantially parallel to each other.

The cutouts 191 and 196 extend approximately from a left longitudinal edge of the pixel electrode 190 approximately to transverse edges of the pixel electrode 190. The cutouts 192 and 195 extend approximately from the left edge of the pixel electrode 190 approximately to a longitudinal right edge of the pixel electrode 190.

The center cutout 193 includes a transverse portion extending approximately from the left edge of the pixel electrode 190 along the imaginary transverse line and a pair of oblique portions extending from the transverse portion to the right edge of the pixel electrode 190 and extending substantially parallel to the lower cutouts 191 and 192 and the upper cutouts 195 and 196, respectively. The center cutout 194 extends along the transverse center line of the pixel electrode 190 and has an inlet from the right edge of the pixel electrode 190, which has a pair of inclined edges substantially parallel to the lower cutouts 191 and 192 and the upper cutouts 195 and 196, respectively.

Accordingly, the lower half of the pixel electrode 190 is partitioned into four lower partitions by the lower cutouts 191 and 192 and the center cutout 193, and the upper half of the pixel electrode 190 is also partitioned into four upper partitions by the upper cutouts 195 and 196 and the center cutout 193. The number of partitions or the number of the cutouts is varied depending on the design factors such as the size of pixels, the ratio of the transverse edges and the longitudinal edges of the pixel electrodes 190, the type and characteristics of the LC layer 300, and so on.

The contact assistants 82 are connected to the end portions 179 of the data lines 171 through the contact holes 182. The contact assistants 82 protect the end portions 179 and complement the adhesion of the end portions 179 and external devices.

The overpasses 83 cross over the gate lines 121 and they are connected to the exposed portions of the storage electrode lines 131 through the contact holes 183 and 184 that are disposed opposite each other with respect to the gate lines 121. A plurality of metal pieces (not shown) may be disposed on the gate insulating layer 140 opposite the gate lines 121 and the overpasses 83 may overlap the metal pieces or may be electrically connected to the metal pieces. The storage electrode lines 131 including the storage electrodes 133a-133c along with the overpasses 83 and the metal pieces are used for repairing defects in the gate lines 121, the data lines 171, or the TFTs. The electrical connection between the gate lines 121 and the storage electrode lines 131 for repairing the gate lines 121 is obtained by illuminating the cross points of the gate lines 121 and the overpasses 83 by a laser beam to electrically connect the gate lines 121 to the overpasses 83. In this case, the metal pieces enhance the electrical connection between the gate lines 121 and the overpasses 83.

The description of the common electrode panel 200 follows with reference to FIGS. 2-4.

A light blocking member 220 called a black matrix for preventing light leakage is formed on an insulating substrate 210 such as transparent glass. The light blocking member 220 may include a plurality of openings that face the pixel electrodes 190 and it may have substantially the same shape as the pixel electrodes 190.

A plurality of color filters 230 are formed on the substrate 210 and they are disposed substantially in the areas enclosed by the light blocking member 220. The color filters 230 may extend substantially in the longitudinal direction along the pixel electrodes 190. Each of the color filters 230 may represent one of the primary colors such as red, green and blue colors.

An overcoat 250 for preventing the color filters 230 from being exposed and for providing a flat surface is formed on the color filters 230 and the light blocking member 220.

A common electrode 270 preferably made of transparent conductive material such as ITO and IZO is formed on the overcoat 250.

The common electrode 270 has a plurality of sets of cutouts 271-276 having pairs of notches 277, each pair of the notches facing each other.

A set of cutouts 271-276 face a pixel electrode 190 and include a plurality of lower and upper cutouts 271 and 272 and 275 and 276 and center cutouts 273 and 274. Each of the cutouts 271-276 is disposed between adjacent cutouts 191-196 of the pixel electrode 190 or between a cutout 196 and a chamfered edge of the pixel electrode 190. In addition, each of the cutouts 271-276 has at least an oblique portion extending parallel to the lower cutouts 191 and 192 or the upper cutouts 195 and 196 of the pixel electrode 190. The cutouts 271-276 substantially have inversion symmetry with respect to an imaginary transverse line bisecting the pixel electrode 190.

Each of the cutouts 271 and 276 has an oblique portion extending approximately from a left edge of the pixel electrode 190 approximately to a lower or upper edge of the pixel electrode 190 and transverse and longitudinal portions extending from respective ends of the oblique portion along edges of the pixel electrode 190, overlapping the edges of the pixel electrode 190, and making obtuse angles with the oblique portion.

Each of the cutouts 272 and 275 has an oblique portion, a longitudinal portion connected to an end of the oblique portion, and an expansion connected to the other end of the oblique portion. The oblique portion extends approximately from the left edge of the pixel electrode 190 approximately to lower right or upper right corner of the pixel electrode 190. The longitudinal portion extends from the end of the oblique portion along the left edge of the pixel electrode 190, overlaps the left edge of the pixel electrode 190, and makes an obtuse angle with the oblique portion. The expansion covers the respective corner of the pixel electrode 190.

The cutout 273 has a pair of oblique portions extending approximately from the center of the left edge of the pixel electrode 190 to the right edge of the pixel electrode 190, a transverse portion extending from a meeting point of the oblique portions to the left, and a pair of longitudinal portions extending from the respective oblique portions along the right edge of the pixel electrode 190, overlapping the right edge of the pixel electrode 190, and making an obtuse angle with the respective oblique portions. The cutout 274 has a transverse portion extending along the transverse center line of the pixel electrode 190, a pair of oblique portions extending from the transverse portion approximately to the right edge of the pixel electrode 190 and making obtuse angles with the transverse portion, and a pair of longitudinal portions extending from the respective oblique portions along the right edge of the pixel electrode 190, overlapping the right edge of the pixel electrode 190, and making an obtuse angle with the respective oblique portions.

The number of the cutouts 271-276 may be varied depending on the design factors, and the light blocking member 220 may also overlap the cutouts 271-276 to block the light leakage through the cutouts 271-276.

Alignment layers 11 and 21 that may be homeotropic are coated on inner surfaces of the panels 100 and 200, and polarizers 12 and 22 are provided on outer surfaces of the panels 100 and 200 such that their polarization axes may be crossed and one of the transmissive axes may be parallel to the gate lines 121. One of the polarizers may be omitted when the LCD is a reflective LCD.

The LCD may further include at least one retardation film for compensating the retardation of the LC layer 300.

It is preferable that the LC layer 300 has negative dielectric anisotropy and it is subjected to a vertical alignment that the LC molecules 310 in the LC layer 300 are aligned such that their long axes are substantially vertical to the surfaces of the panels 100 and 200 in absence of electric field.

As shown in FIG. 3, a set of the cutouts 191-196 and 271-276 divides a pixel electrode 190 into a plurality of sub-areas and each sub-area has two major edges.

The cutouts 91-96 and 271-276 as well as the trenches 186 control the tilt directions of the LC molecules 310 in the LC layer 300. This will be described in detail.

The cutouts 191-196 and 271-276 control the tilt directions of the LC molecules in the LC layer 3. This will be described in detail.

Upon application of the common voltage to the common electrode 270 and a data voltage to the pixel electrodes 190, an electric field substantially perpendicular to the surfaces of the panels 100 and 200 is generated. The LC molecules tend to change their orientations in response to the electric field such that their long axes are perpendicular to the field direction.

The cutouts 191-196 and 271-276 of the electrodes 190 and 270 and the edges of the pixel electrodes 190 distort the electric field to have a horizontal component that is substantially perpendicular to the edges of the cutouts 191-196 and 271-276 and the edges of the pixel electrodes 190. Accordingly, the LC molecules on each sub-area are tilt in a direction by the horizontal component and the azimuthal distribution of the tilt directions are localized to four directions, thereby increasing the viewing angle of the LCD.

In the meantime, the horizontal components generated by opposite edges of a cutout 191-196 or 271-275 are antiparallel and they may be nearly destructed. Accordingly, the tilt directions of the LC molecules 310 in the cutouts 191-196 and 271-275 are nearly random, thereby causing texture. A notch 277 of a cutout 271-276 generates a secondary horizontal component to determine the orientations of the LC molecules 310 disposed near the cutouts 271-276. For example, the LC molecules 310 disposed near a notch 277 in a cutout 271-276 tend to tilt in a direction perpendicular to an edge of the notch 277. Therefore, the LC molecules 310 in the cutouts 271-276 can tilt in a direction determined by the notches 277 and the texture may be reduced.

At least one of the cutouts 191-196 and 271-276 can be substituted with protrusions or depressions made of organic or inorganic material and the notches 277 can be also provided at the protrusions and the depressions.

The shapes and the arrangements of the cutouts 191-196 and 271-276 and the notches 277 may be modified.

FIGS. 5A-5D illustrate various shapes of the notches shown in FIGS. 2 and 3.

Referring to FIGS. 5A-5D, the notches 277 are triangular, rectangular, trapezoidal, or semicircular and they are convex or concave. As described above, the LC molecules 310 near the notches 277 are aligned such that their long axes are perpendicular to edges of the notches 277 and almost all the LC molecules in the cutouts 271-276 exhibit stable alignment. Accordingly, width of the cutouts 271-276 can be remained in a range of about 8-10 microns.

Several notches 277 may be provided at one cutout 271-276 and the convex notches and the concave notches may be alternately arranged. The notches 277 may be provided either or both of the pixel electrodes 190 and the common electrode 270.

An LCD according to another embodiment of the present invention will be described in detail with reference to FIGS. 6 and 7.

Figure 6:
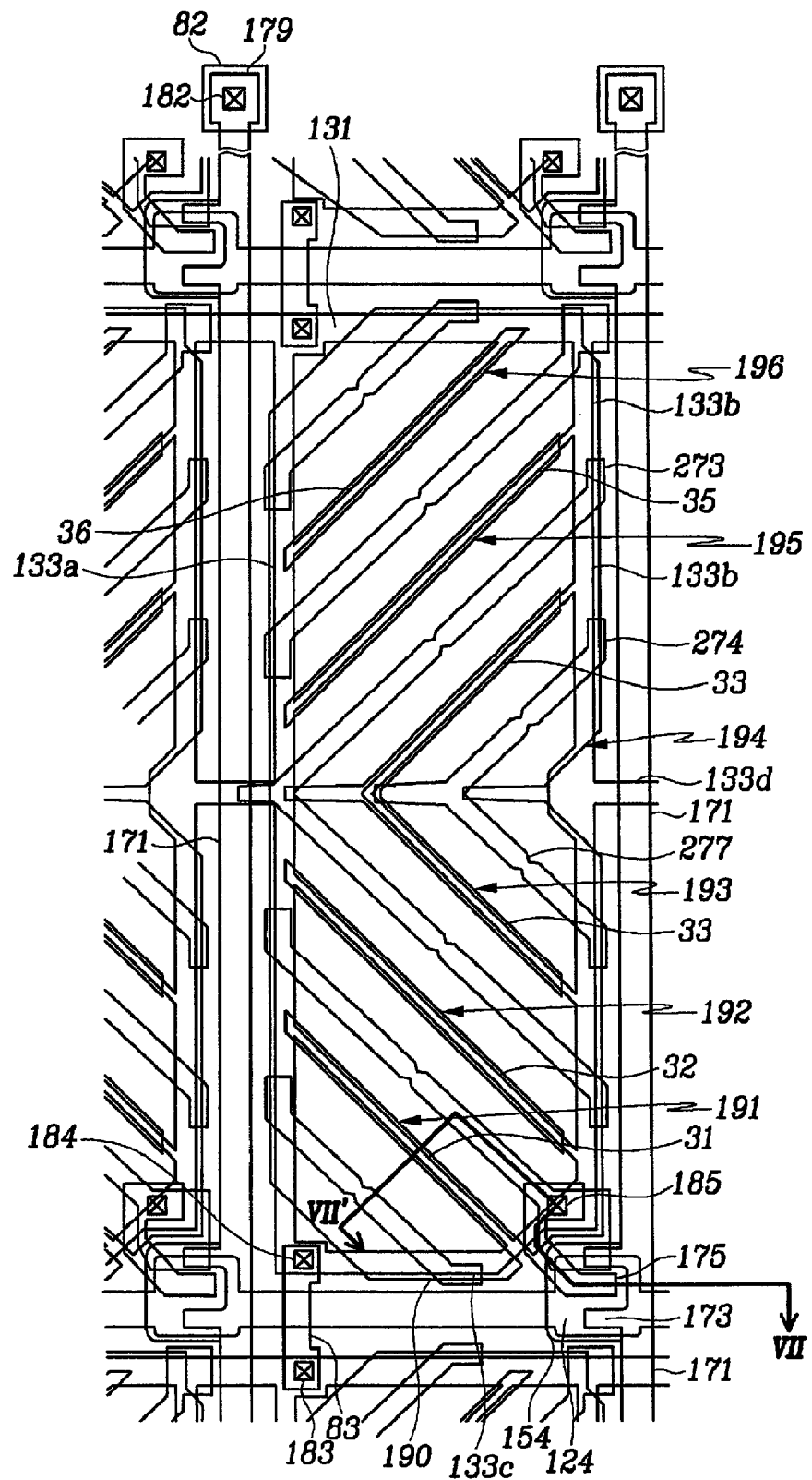
FIG. 6 is a layout view of an LCD according to another embodiment of the present invention.
Figure 7:
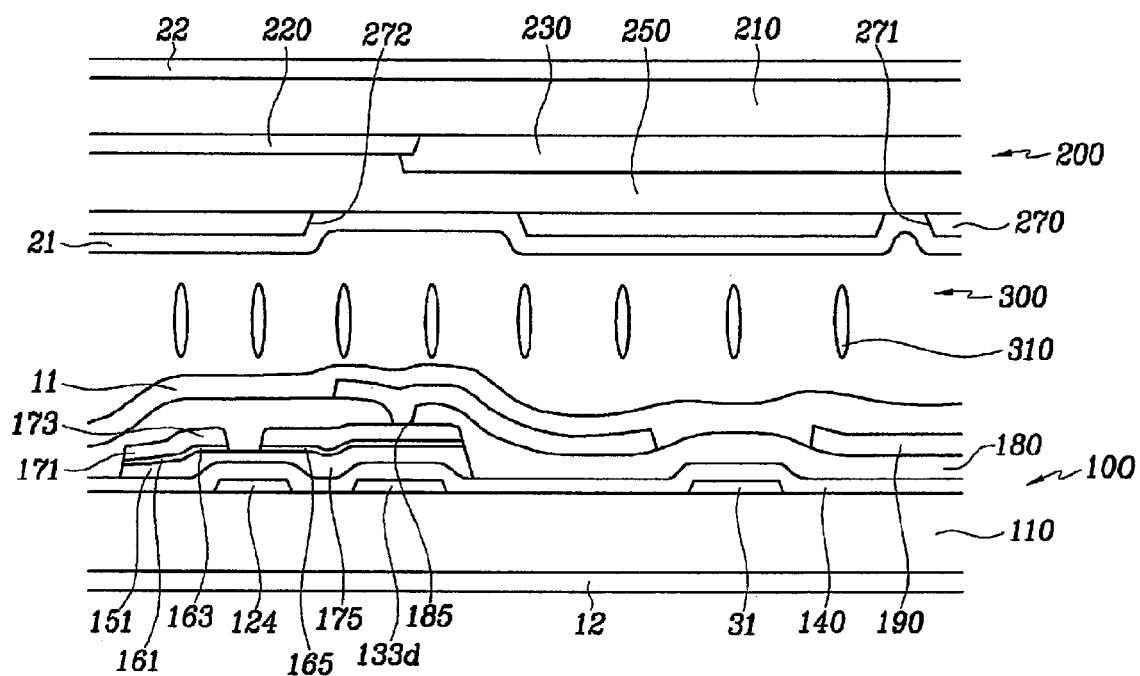
FIG. 7 is a sectional view of the LCD shown in FIG. 6 taken along the line VII-VII'.

FIG. 6 is a layout view of an LCD according to another embodiment of the present invention, and FIG. 7 is a sectional view of the LCD shown in FIG. 6 taken along the line VII-VII'.

Referring to FIGS. 6 and 7, an LCD according to this embodiment also includes a TFT array panel 100, a common electrode panel 200, and a LC layer 300 interposed therebetween. Layered structures of the panels 100 and 200 according to this embodiment are almost the same as those shown in FIGS. 1-4.

Regarding the TFT array panel 100, a plurality of gate lines 121 including a plurality of gate electrodes 124 and a plurality of storage electrode lines 131 including a plurality of ring-shaped branches 133a-133c, oblique branches 31-36, and connections 133d are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175, are formed on the ohmic contacts 161 and 165, and a passivation layer 180 are formed thereon. A plurality of contact holes 182 and 185 are provided at the passivation layer 180, and a plurality of pixel electrodes 190 and a plurality of contact assistants 82 are formed on the passivation layer 180. An alignment layer 11 and a polarizer 12 are disposed on inner and outer surfaces of the TFT array panel 100.

Regarding the common electrode panel 200, a light blocking member 220, a plurality of color filters 230, an overcoat 250, a common electrode 270 having cutouts 275-277 to having notches 277, and an alignment layer 21 are formed on an insulating substrate 210. An alignment layer 21 and a polarizer 22 are disposed on inner and outer surfaces of the common electrode panel 200.

Different from the TFT array panel 100 shown in FIGS. 1, 3 and 4, the semiconductor stripes 151 of the TFT array panel 100 according to this embodiment have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

A manufacturing method of the TFT array panel 100 according to an embodiment simultaneously forms the data lines 171, the drain electrodes 175, the metal pieces 172, the semiconductors 151, and the ohmic contacts 161 and 165 using one photolithography process.

A photoresist pattern for the photolithography process has position-dependent thickness, and in particular, it has first and second portions with decreased thickness. The first portions are located on wire areas that will be occupied by the data lines 171, the drain electrodes 175, and the metal pieces 172 and the second portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

Many of the above-described features of the LCD shown in FIGS. 1-4 may be appropriate to the TFT array panel shown in FIGS. 6 and 7.

An LCD according to another embodiment of the present invention is described in detail with reference to FIGS. 8-11.

Figure 8:
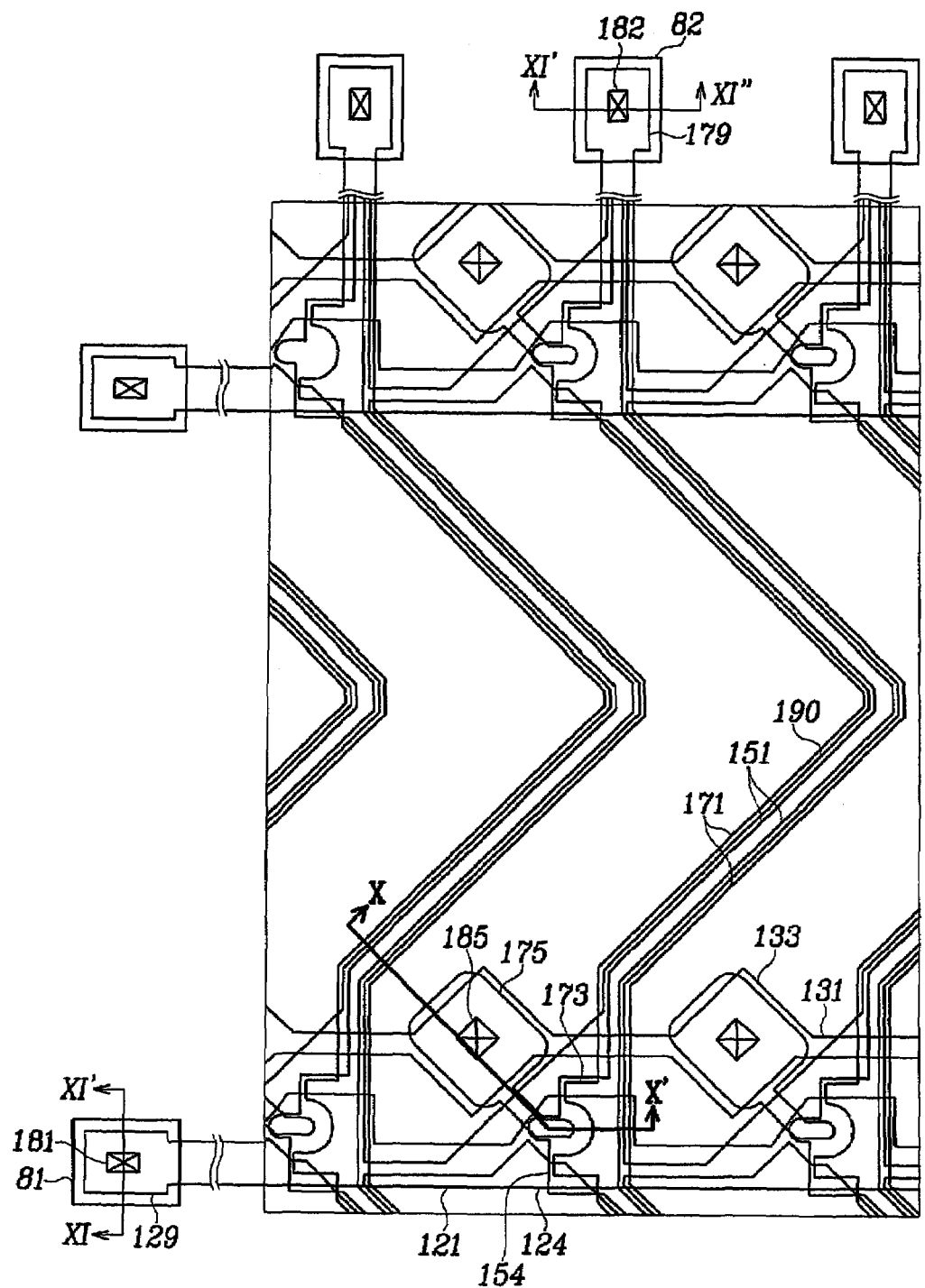
FIG. 8 is a layout view of a TFT array panel for an LCD according to an embodiment of the present invention.
Figure 9:
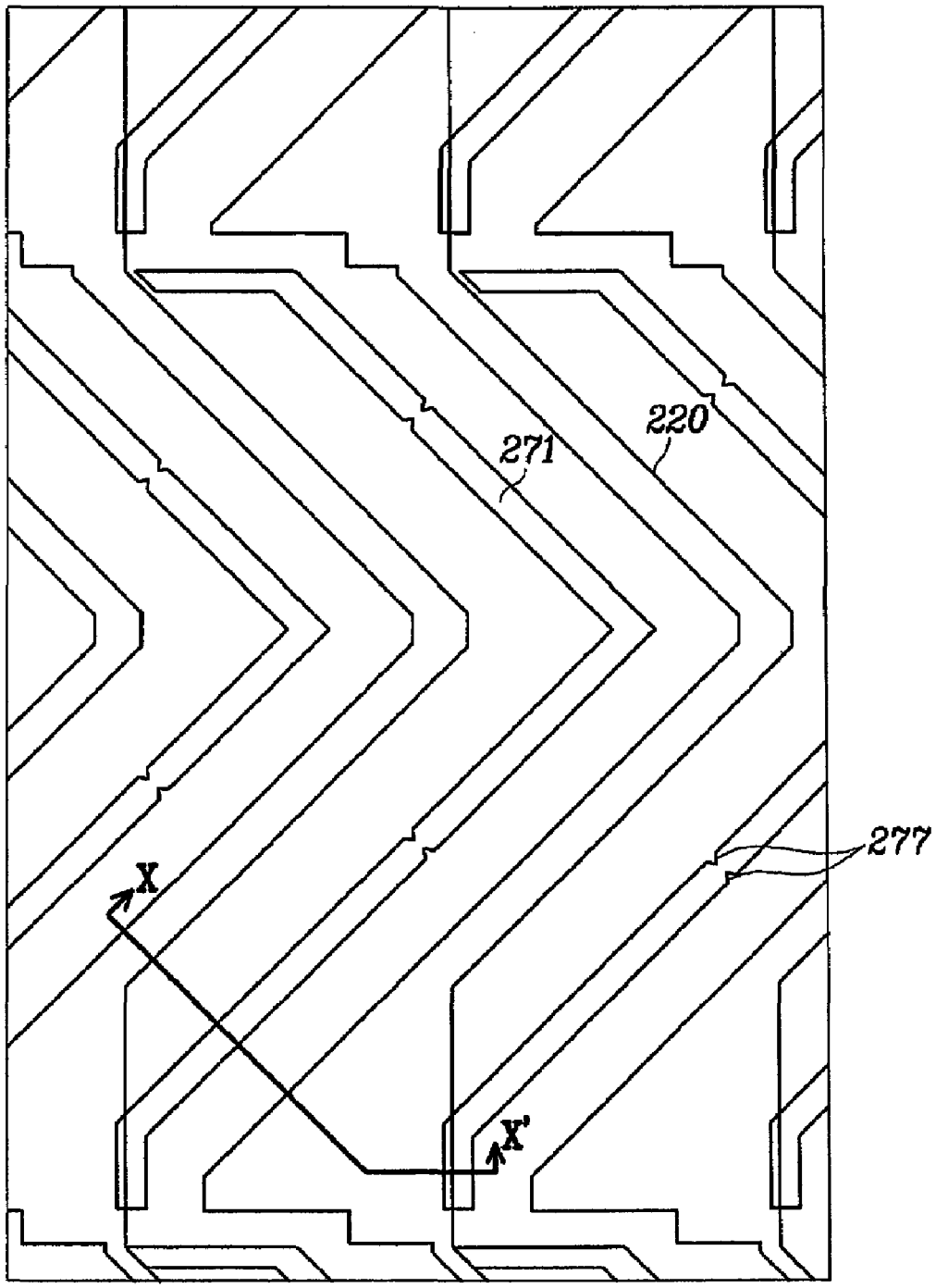
FIG. 9 is a layout view of a common electrode panel for an LCD according to an embodiment of the present invention.
Figure 10:
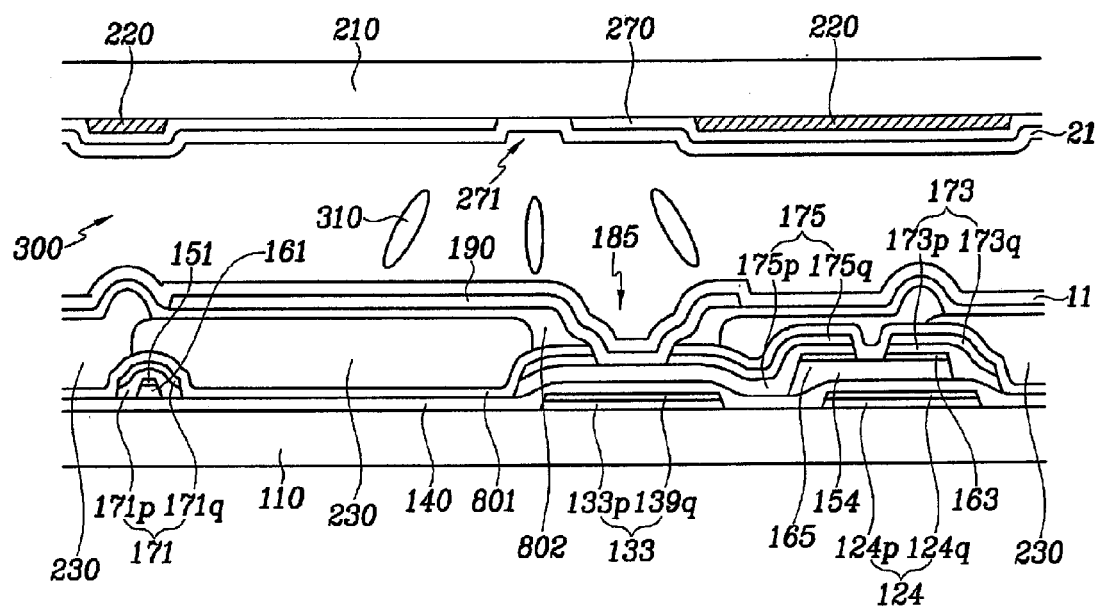
FIG. 10 is a sectional view of an LCD shown including the TFT array panel shown in FIG. 8 and the common electrode panel shown in FIG. 9 taken along the line X-X'.
Figure 11:
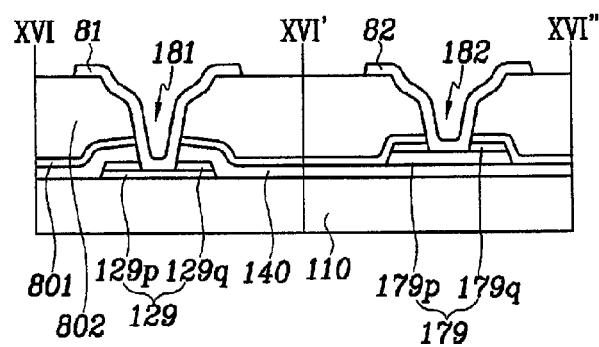
FIG. 11 is a sectional view of the LCD shown in FIG. 3 taken along the lines XI-XI' and XI'-XI".

FIG. 8 is a layout view of a TFT array panel for an LCD according to an embodiment of the present invention, FIG. 9 is a layout view of a common electrode panel for an LCD according to an embodiment of the present invention, FIG. 10 is a sectional view of an LCD shown including the TFT array panel shown in FIG. 8 and the common electrode panel shown in FIG. 9 taken along the line X-X', and FIG. 11 is a sectional view of the LCD shown in FIG. 3 taken along the lines XI-XI' and XI'-XI".

An LCD according to this embodiment includes a TFT array panel 100, a common electrode panel 200 facing the TFT array panel 100, and a LC layer 300 interposed between the TFT array panel 100 and the common electrode panel 200.

The TFT array panel 100 is now described in detail with reference to FIGS. 8, 10 and 11.

A plurality of gate lines 121 and a plurality of storage electrode lines 131 are formed on an insulating substrate 110.

The gate lines 121 extend substantially in a transverse direction and are separated from each other. Each gate line 121 includes a plurality of projections forming a plurality of gate electrodes 124 and an end portion 129 having a large area for contact with another layer or an external device.

Each storage electrode line 131 extends substantially in the transverse direction and includes a plurality of projections forming storage electrodes 133. Each storage electrode 133 has a shape of a diamond or a rectangle rotated by about 45 degrees and it is located close to the lower of adjacent two of the gate lines 121. The storage electrode lines 131 are supplied with a predetermined voltage such as a common voltage, which is applied to a common electrode 270 on the common electrode panel 200 of the LCD.

The gate lines 121 and the storage electrode lines 131 have a double-layered structure including two films having different physical characteristics, a lower film and an upper film. The upper film is preferably made of low resistivity metal including Al containing metal such as Al and Al alloy, Ag containing metal such as Ag and Ag alloy, or Cu containing metal such as Cu and Cu alloy for reducing signal delay or voltage drop in the gate lines 121 and the storage electrode lines 131. On the other hand, the lower film is preferably made of material such as Cr, Mo, Mo alloy, Ta, or Ti, which has good physical, chemical, and electrical contact characteristics with other materials such as indium tin oxide (ITO) or indium zinc oxide (IZO). A good exemplary combination of the lower film material and the upper film material is Cr and Al—Nd alloy. In FIGS. 10 and 11, the lower and the upper films of the gate electrodes 124 are indicated by reference numerals 124p and 124q, respectively, the lower and the upper films of the end portions 129 are indicated by reference numerals 129p and 129q, respectively, and the lower and the upper films of the storage electrodes 133 are indicated by reference numerals 133p and 133q, respectively. Portions of the upper film 129q of the end portions 129 of the gate lines 121 are removed to expose the underlying portions of the lower films 129p.

Alternatively, the gate lines 121 and the storage electrode lines 131 may include an upper film having a good contact characteristic and a lower film having low resistivity and an example thereof is a Mo upper film and an Al lower film. Furthermore, the gate lines 121 and the storage electrode lines 131 may have a single layer structure preferably including Al containing metal, Ag containing metal, Cu containing metal, Mo containing metal, Cr, Ti or Ta or may include three or more layers.

In addition, the lateral sides of the gate lines 121 and the storage electrode lines 131 are inclined relative to a surface of the substrate 110, and the inclination angle thereof ranges about 30-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated as "a-Si") or polysilicon are formed on the gate insulating layer 140. Each semiconductor stripe 151 extends substantially in the longitudinal direction while it is curved periodically. Each semiconductor stripe 151 has a plurality of projections 154 branched out toward the gate electrodes 124.

A plurality of ohmic contact stripes and islands 161 and 165 preferably made of silicide or n+hydrogenated a-Si heavily doped with n type impurity such as phosphorous (P) are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range between about 30-80 degrees.

A plurality of data lines 171 and a plurality of drain electrodes 175 separated from each other are formed on the ohmic contacts 161 and 165 and the gate insulating layer 140.

The data lines 171 for transmitting data voltages extend substantially in the longitudinal direction and intersect the gate lines 121 and the storage electrode lines 131. Each data line 171 has an end portion 179 having a large area for contact with another layer or an external device and it includes a plurality of pairs of oblique portions and a plurality of longitudinal portions such that it curves periodically. A pair of oblique portions are connected to each other to form a chevron and opposite ends of the pair of oblique portions are connected to respective longitudinal portions. The oblique portions of the data lines 171 make an angle of about 45 degrees with the gate lines 121, and the longitudinal portions cross over the gate electrodes 124. The length of a pair of oblique portions is about one to nine times the length of a longitudinal portion, that is, it occupies about 50-90 percents of the total length of the pair of oblique portions and the longitudinal portion.

Each longitudinal portion of the data lines 171 includes a plurality of branches, which project towards the gate electrodes 124 to form curved (like a crescent) source electrodes 173. Each drain electrode 175 includes a rectangular or rhombic expanded end portion, which has a large area for contact with another layer and overlaps a storage electrode 133, and another end portion partly enclose by a source electrode 173. The edges of the expansions of the drain electrode 175 are substantially parallel to the edges of the storage electrodes 133. Each set of a gate electrode 124, a source electrode 173, and a drain electrode 175 along with a projection 154 of a semiconductor stripe 151 form a TFT having a channel formed in the semiconductor projection 154 disposed between the source electrode 173 and the drain electrode 175.

The data lines 171 and the drain electrodes 175 also include a lower film 171p and 175p preferably made of refractory metal such as Cr, Mo, Ti, Ta, or alloys thereof and an upper film 171q and 175q located thereon and preferably made of Al containing metal, Ag containing metal, or Cu containing metal. In FIGS. 10 and 11, the lower and the upper films of the source electrodes 173 are indicated by reference numerals 173p and 173q, respectively, and the lower and the upper films of the end portions 179 of the data lines 171 are indicated by reference numerals 179p and 179q, respectively. Portion of the upper films 179q and 175q of the expansions 179 of the data lines 171 and the drain electrodes 175 are removed to expose the underlying portions of the lower films 179p and 175p.

Like the gate lines 121 and the storage electrode lines 131, the data lines 171 and the drain electrodes 175 have inclined lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween.

A lower passivation film 801 preferably made of silicon nitride or silicon oxide is formed on the data lines 171 and the drain electrodes 175, and exposed portions of the semiconductor stripes 151, which are not covered with the data lines 171 and the drain electrodes 175.

A plurality of color filter stripes 230 are formed on the lower passivation film 801. Each of the color filter stripes 230 are disposed substantially between adjacent two the data lines 171 and extends substantially in the longitudinal direction, while it curves periodically. The color filter stripes 230 have a plurality of openings at the drain electrodes 175 and they are not disposed on a peripheral area which is provided with the end portions 129 of the gate lines 121 and the end portions 179 of the data lines 171. Each of the color filter stripes 230 represents one of three primary colors such as red, green and blue and the colors are arranged in turn in the transverse direction. Adjacent two of the color filter stripes 230 representing different colors overlap each other to enhance the blocking of light leakage, but they may have coincident edges or may be spaced apart from each other. The overlapping portions of the color filter stripes 230 form hills extending along the data lines 171.

An upper passivation film 802 is formed on the color filter stripes 230 and one of the lower and the upper passivation films 801 and 802 may be omitted. The upper passivation film 802 is preferably made of photosensitive organic material having a good flatness characteristic or low dielectric insulating material such as a-Si:C:O and a-Si:O:F formed by plasma enhanced chemical vapor deposition (PECVD). However, the upper passivation film 802 may be also made of inorganic material. The upper insulating film 802 protrudes upward on the hills formed by the color filter stripes 230 such that the protrusions of the upper insulating layer 802 enhance the control of the tilt directions of the LC molecules 310 in the LC layer 300.

The passivation films 801 and 802 have a plurality of contact holes 182 and 185 exposing the end portions 179 of the data lines 171 and the drain electrodes 175, respectively, and the contact holes 185 is smaller than the openings of the color filter stripes 230. The passivation films 801 and 802 and the gate insulating layer 140 have a plurality of contact holes 182 exposing the end portions 129 of the gate lines 121. The sidewalls of the contact holes 181, 182 and 185 are inclined with an angle of about 30-85 degrees or have stepwise profiles.

A plurality of pixel electrodes 190 and a plurality of contact assistants 81 and 82, which are preferably made of ITO or IZO, are formed on the upper passivation film 802. Alternatively, the pixel electrodes 190 may be made of transparent conductive polymer, and, for a reflective LCD, the pixel electrodes 190 are made of opaque reflective metal such as Cr. In these cases, the contact assistants 81 and 82 may be made of material such as ITO or IZO different from the pixel electrodes 190.

Each pixel electrode 190 is located substantially in an area enclosed by the data lines 171 and the gate lines 121, and thus it also forms a chevron. The pixel electrodes 190 cover the storage electrode lines 131 including the storage electrodes 133 and the expansions of the drain electrodes 175 and have chamfered edges substantially parallel to edges of the storage electrodes 133 that are close to the chamfered edges.

The pixel electrodes 190 are physically and electrically connected to the drain electrodes 175 through the contact holes 185 such that the pixel electrodes 190 receive the data voltages from the drain electrodes 175.

The pixel electrodes 190 overlap the storage electrode lines 131 to form storage capacitors. The capacitances of the storage capacitors, i.e., the storage capacitances are increased by providing the projections (i.e., the storage electrodes 133) at the storage electrode lines 131, elongating the drain electrodes 175 connected to the pixel electrodes 190, and providing the expansions at the drain electrodes 175 overlapping the storage electrodes 133 of the storage electrode lines 131 for decreasing the distance between the terminals and increasing the overlapping areas.

The pixel electrodes 190 overlap the data lines 171 as well as the gate lines 121 to increase aperture ratio.

The contact assistants 81 and 82 are connected to the exposed end portions 129 of the gate lines 121 and the exposed end portions 179 of the data lines 171 through the contact holes 181 and 182, respectively. The contact assistants 81 and 82 protect the exposed portions 129 and 179 and complement the adhesiveness of the exposed portions 129 and 179 and external devices.

Finally, an alignment layer 11 that may be homeotropic is formed on the pixel electrodes 190 and the upper passivation film 802.

The description of the common electrode panel 200 follows with reference to FIGS. 9-11.

A light blocking member 220 is formed on an insulating substrate 210 such as transparent glass and it includes a plurality of oblique portions facing the oblique portions of the data lines 171 and a plurality of right-angled-triangular portions facing the TFTs and the longitudinal portions of the data lines 171 such that the light blocking member 220 prevents light leakage between the pixel electrodes 190 and defines open areas facing the pixel electrodes 190. Each of the triangular portions of the light blocking member 220 has a hypotenuse parallel to a chamfered edge of a pixel electrode 190.

A common electrode 270 preferably made of transparent conductive material such as ITO and IZO is formed on the light blocking member 220 and the substrate 210. The common electrode 270 is supplied with the common voltage and it has a plurality of chevron-like cutouts 271 having notches 277.

Each cutout 271 includes a pair of oblique portions connected to each other, a transverse portion connected to one of the oblique portions, and a longitudinal portion connected to the other of the oblique portions. The oblique portions of the cutout 271 extend substantially parallel to the oblique portions of the data lines 171 and face a pixel electrode 190 so that they may bisect the pixel electrode 190 into left and right halves. The transverse and the longitudinal portions of the cutout 271 are aligned with transverse and longitudinal edges of the pixel electrode 190, respectively, and they make obtuse angles with the oblique portions of the cutout 271. The cutouts 271 are provided for controlling the tilt directions of the LC molecules 310 in the LC layer 300 and preferably have a width in a range between about 9-12 microns. The cutouts 271 may be substituted with protrusions preferably made of organic material and preferably having width ranging about 5 microns to 10 microns.

An alignment layer 21 that may be homeotropic is coated on the common electrode 270.

A pair of polarizers (not shown) are provided on outer surfaces of the panels 100 and 200 such that their transmissive axes are crossed and one of the transmissive axes is parallel to the gate lines 121. One of the polarizers may be omitted when the LCD is a reflective LCD.

The LCD may further include at least one retardation film for compensating the retardation of the LC layer 300.

It is preferable that the LC layer 300 has negative dielectric anisotropy and it is subjected to a vertical alignment that the LC molecules 310 in the LC layer 300 are aligned such that their long axes are substantially vertical to the surfaces of the panels 100 and 200 in absence of electric field.

Upon application of the common voltage to the common electrode 270 and a data voltage to the pixel electrodes 190, a primary electric field substantially perpendicular to the surfaces of the panels 100 and 200 is generated. The LC molecules 310 tend to change their orientations in response to the electric field such that their long axes are perpendicular to the field direction. In the meantime, the cutouts 271 of the common electrode 270 and the edges of the pixel electrodes 190 distort the primary electric field to have a horizontal component which determines the tilt directions of the LC molecules 310. The horizontal component of the primary electric field is perpendicular to the edges of the cutouts 271 and the edges of the pixel electrodes 190.

Accordingly, four sub-regions having different tilt directions, which are partitioned by edges of a pixel electrode 190, a cutout 271 bisecting the pixel electrode 190, and an imaginary transverse center line passing through the meeting point of the oblique portions of the cutout 271, are formed in a pixel region of the LC layer 300, which are located on the pixel electrode 190. Each sub-region has two major edges defined by the cutout 271 and an oblique edge of the pixel electrode 190, respectively. The sub-regions are classified into a plurality of, preferably four, domains based on the tilt directions.

In the meantime, the direction of a secondary electric field due to the voltage difference between the pixel electrodes 190 is perpendicular to the edges of the cutouts 271. Accordingly, the field direction of the secondary electric field coincides with that of the horizontal component of the primary electric field. Consequently, the secondary electric field between the pixel electrodes 190 enhances the determination of the tilt directions of the LC molecules 310.

Since the LCD performs inversion such as dot inversion, column inversion, etc., adjacent pixel electrodes are supplied with data voltages having opposite polarity with respect to the common voltage and thus a secondary electric field between the adjacent pixel electrodes is almost always generated to enhance the stability of the domains.

Since the tilt directions of all domains make an angle of about 45 degrees with the gate lines 121, which are parallel to or perpendicular to the edges of the panels 100 and 200, and the 45-degree intersection of the tilt directions and the transmissive axes of the polarizers gives maximum transmittance, the polarizers can be attached such that the transmissive axes of the polarizers are parallel to or perpendicular to the edges of the panels 100 and 200 and it reduces the production cost.

The resistance increase of the data lines 171 due to the curving can be compensated by widening the data lines 171 since distortion of the electric field and increase of the parasitic capacitance due to the increase of the width of the data lines 171 can be compensated by increasing the size of the pixel electrodes 190 and by adapting a thick organic passivation film.

The LCD shown in FIGS. 8-11 can have several modifications.

For example, the pixel electrodes 190 as well as the common electrode 270 may have cutouts (not shown) for generating fringe field. Furthermore, the cutouts may be substituted with protrusions disposed on the common electrode 270 or the pixel electrodes 190.

The shapes and the arrangements of the cutouts 272 or the protrusions and the notches 277 may be varied depending on the design factors such as the size of pixels 190, the ratio of the transverse edges and the longitudinal edges of the pixel electrodes 190, the type and characteristics of the liquid crystal layer 300, and so on.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising;
    a first substrate;
    a plurality of pixel electrodes formed on the first substrate;
    a second substrate;
    a common electrode formed on the second substrate; and
    a liquid crystal layer interposed between the first substrate and the second substrate,
    wherein at least one of the pixel electrode and the common electrode have a plurality of tilt direction determining members and at least one of the tilt direction determining members is a cutout and comprises an oblique portion having a pair of notches facing each other.

2. The liquid crystal display of claim 1, wherein at least one of the tilt direction determining members comprises a protrusion.

3. The liquid crystal display of claim 2, wherein the protrusion has a height being the same as or less than the width of the tilt direction determining members.

4. The liquid crystal display of claim 3, wherein the tilt direction determining members has a width ranging about 8-10 microns.

5. The liquid crystal display of claim 1, wherein at least one of the tilt direction determining members comprises a protrusion or a depression.

6. The liquid crystal display of claim 1, wherein the notches are convex or concave.

7. The liquid crystal display of claim 1, wherein the notches are triangular, rectangular, trapezoidal, or semicircular.

8. The liquid crystal display of claim 1, wherein the tilt direction determining member has inversion symmetry with respect to a straight line bisecting the pixel electrode.

9. The liquid crystal display of claim 8, wherein the tilt direction determining members comprise two opposite main oblique portions facing each other having the notches, and the notches have an edge oblique to or perpendicular to the main oblique portions.

10. The liquid crystal display of claim 9, wherein the liquid crystal layer has negative anisotropy and subjected to a vertical alignment.

11. The liquid crystal display of claim 10, further comprising:
    a first signal line formed on the first substrate;
    a second signal line formed on the first substrate and intersecting the first signal line;
    a thin film transistor connected to the first and the second signal lines and the pixel electrode;
    a common electrode formed on the second substrate; and
    first and second polarizers disposed on the first and the second substrates and having crossed transmissive axes,
    wherein the transmissive axis of one of the polarizers are parallel to the first signal line.

12. The liquid crystal display of claim 1, wherein the notches are configured to generate a secondary horizontal field component.

* * * * *